April 5, 1938.  J. W. ANDREWS ET AL  2,113,208

EXTRUSION APPARATUS

Filed Jan. 17, 1935  3 Sheets-Sheet 1

INVENTORS  J. W. ANDREWS
C. A. HALLAM
BY
E. R. Nowlan
ATTORNEY

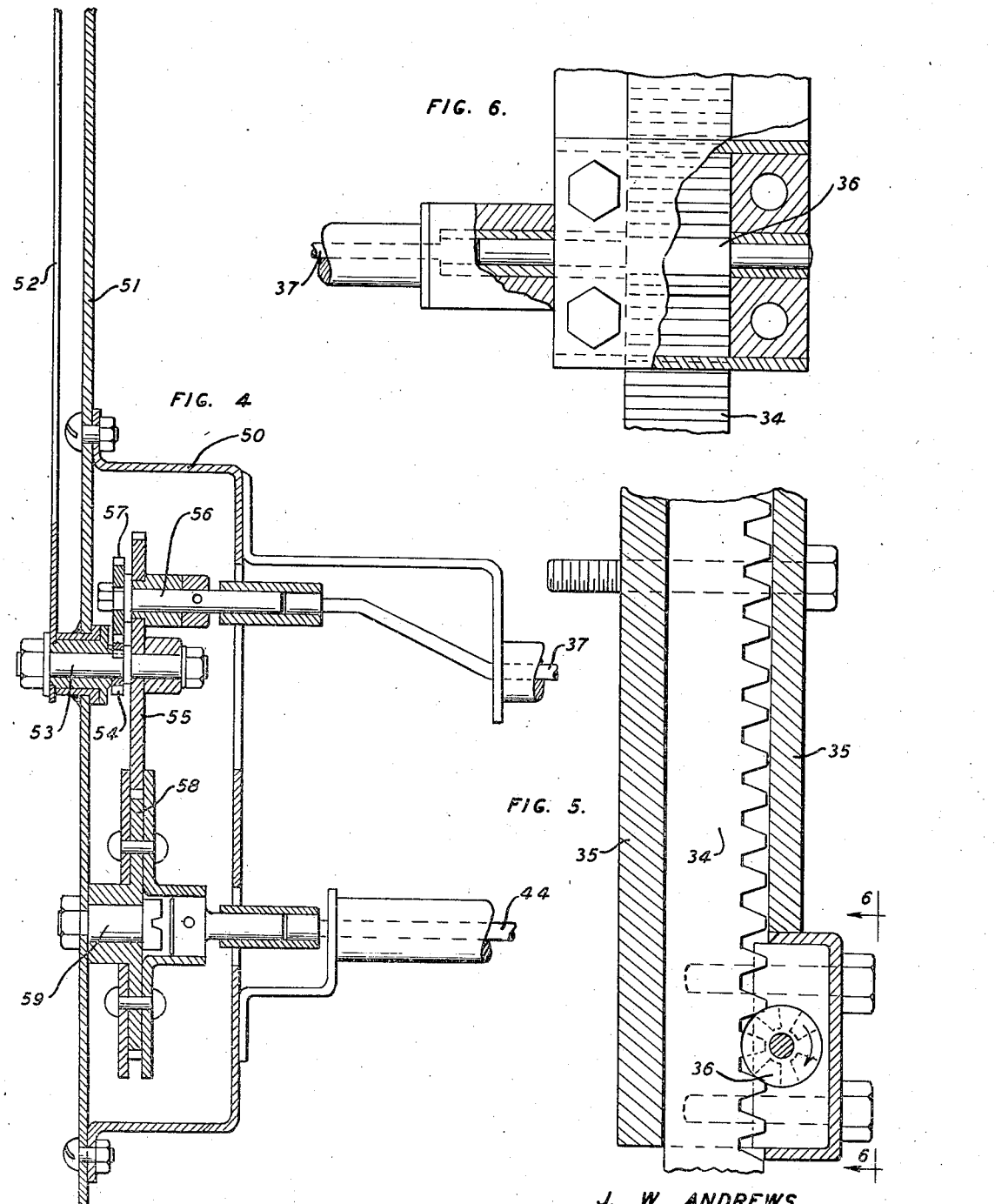

INVENTORS
J. W. ANDREWS
C. A. HALLAM
BY
E. R. Nowlan
ATTORNEY

Patented Apr. 5, 1938

2,113,208

UNITED STATES PATENT OFFICE 2,113,208

EXTRUSION APPARATUS

John W. Andrews, Westfield, and Cecil A. Hallam, Fairhaven, N. J., assignors to Western Electric Company, Incorporated, New York, N. Y., a corporation of New York Application January 17, 1935, Serial No. 2,142

10 Claims. (Cl. 207—2)

This invention relates to a detecting method and apparatus therefor and more particularly to a method and a continuously acting device for application to a machine for continuously extruding material whereby variations in the rate of extrusion of material may be detected.

In some applications of the extrusion process where the material operated on is formed into continuous wires, rods, tubes or the like or is molded into a sheath over a core passing through the apparatus as in the case of manufacturing alloy sheathed cable, it may be of importance for reasons of economy, or, in the case of electrical communications cable, for producing desired electrical characteristics in the product, to control closely the weight of material extruded per unit length of product, and hence to detect variations in this weight.

One object of the present invention is to provide a method of detecting variations in the ratio of displacement or of speed of two distinct moving elements in an apparatus, as for example an extruding means and the extruded product to indicate changes in the weight per unit length of the product, together with a device for automatically carrying on the method.

One embodiment of the invention contemplates the extrusion process as carried on in an extrusion press for extruding a lead alloy sheath on a multi-conductor, paper insulated core in the manufacture of communications cables, the method comprising converting the relative motion of the cylinder and ram of the press into a delicately measurable, correspondingly varying quantity, converting the motion of the sheathed cable away from the extrusion die into a delicately measurable, correspondingly varying quantity of the same quality, altering the value of one of the two quantities to make it equal the other, and balancing the one quantity continuously against the other to observe variations in the two quantities relative to each other. A device for carrying on this method contemplates a means to convert the relative reciprocal motion of the cylinder and ram into a related mechanical motion such as rotation of a gear or into continuous variation of an electrical quantity such as a resistance, a means to convert the advance of the sheathed cable into similar motion of a gear or variation of a resistance, means to balance the motion of the one gear against the motion of the other such as planetary gearing or to balance the one resistance against the other such as an electrical bridge circuit, for example, and means to indicate relative variations, e. g. a pointer on a normally stationary gear or a current detector such as a galvanometer.

Other objects and features of the invention will appear from the following detailed description of two embodiments thereof taken in connection with the accompanying drawings in which like reference numerals are applied to identical parts in the several figures and in which Fig. 1 is a broken schematic view in front elevation of a cable sheathing extrusion press having an indicating device thereon constructed in accordance with the invention;

Fig. 4 is an enlarged detail view on the line 4—4 of Fig. 1;

Fig. 5 is an enlarged detail view on the line 5—5 of Fig. 1;

Fig. 6 is an enlarged detail view on the line 6—6 of Fig. 5;

Figure 1:
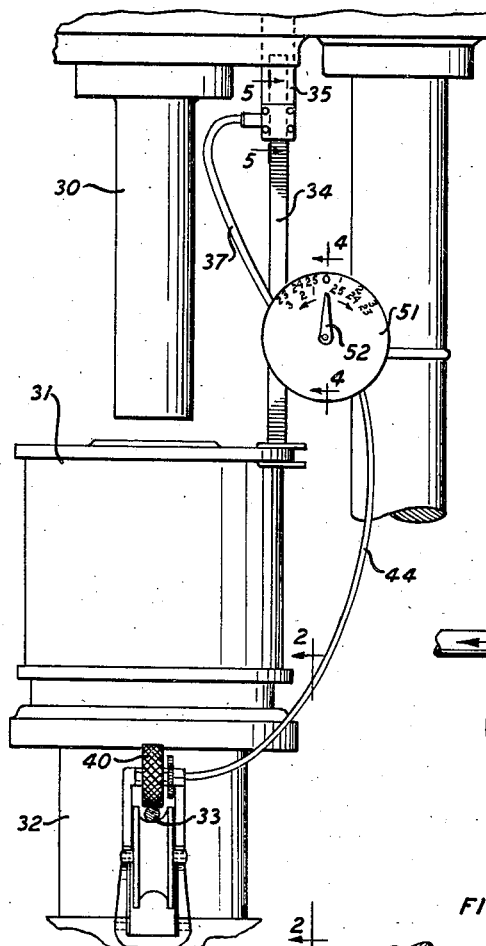
Figure 2:
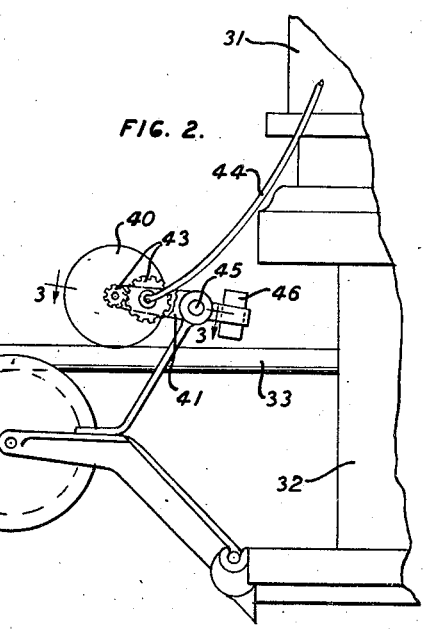
Fig. 2 is an enlarged detail view on the line 2—2 of Fig. 1.
Figure 3:
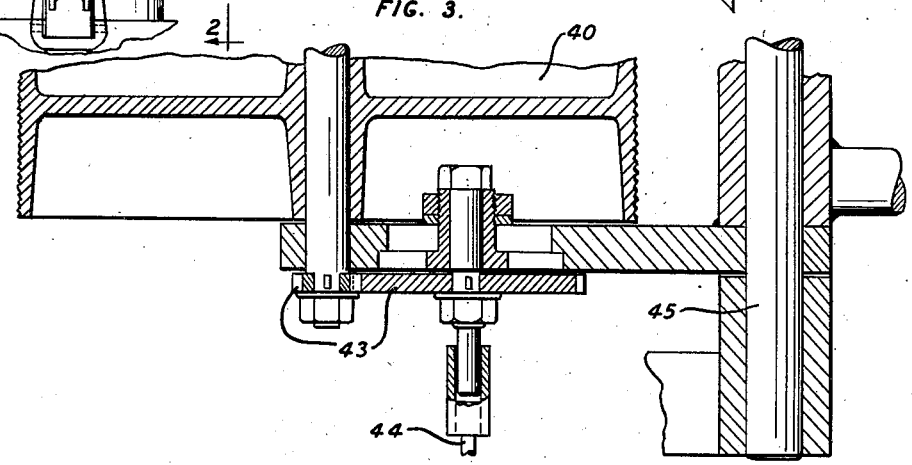
Fig. 3 is an enlarged detail view on the line 3—3 of Fig. 2.

In the embodiment of the invention disclosed in Figs. 1 to 6 inclusive, an extrusion press of customary construction for covering conductor cables by extruding a sheath of lead alloy or other plastic material thereover, has a fixed vertical ram 30 and a cylinder 31 to cooperate therewith which may be raised to extrude or lowered for refilling by means such as a hydraulic ram not shown. An extrusion head 32 is mounted on the lower end of the cylinder and has means to permit a cable 33 to pass therethrough and to form an extruded sheath thereover. The nature and construction of the press are not relevant to the present invention except insofar as the sheathing is done by the relative motion of the ram and cylinder while the cable advances through the extrusion head.

A vertically oriented rack 34 is secured to the cylinder to move therewith, and reciprocates in a stationary housing and guide 35 secured on some stationary part of the ram support. A gear 36 is journalled in the housing to mesh with and be driven by the rack 34, and the gear 36 is coupled to and drives a flexible shaft 37.

A knurled wheel 40 rotatably mounted in one end of a pivotable lever 41 rides peripherally on the sheathed cable and through a train of gears 43, 43 drives a flexible shaft 44. The lever 41 is pivotally supported at 45 on a convenient stationary part of the machine and may have counterpoise 46 on its other arm.

Another housing 50 is mounted at a convenient point on some stationary part of the machine and carries a marked or graduated dial 51 on its front. An indicating pointer 52 plays over the dial and is mounted rigidly on a shaft 53 journalled in the center of the dial and extending rearwardly into the housing 50. A small gear 54 is keyed to the shaft 53 and a large gear 55 is rotatably mounted on the shaft. A shaft 56 is journalled in the gear 55 and has a gear 57 keyed thereto meshing with the gear 54. The shaft 56 is connected to the flexible shaft 37 to be driven thereby. The gear 55 meshes with another gear 58 rotatably mounted on a stub shaft 59 secured to the rear of the dial. The gear 58 is connected to the flexible shaft 44 to be driven thereby.

In operation, a cable core is threaded through the extrusion head 32, the cylinder is filled with alloy, and the hydraulic ram or other means to raise the cylinder is set in motion. When the ram 30 enters the cylinder, the alloy is extruded through the head 32 and around the cable core which emerges from the head sheathed with a concentric seamless and continuous outer layer, or coating of alloy.

As the cylinder moves up along the ram, the volume of alloy within the cylinder decreases and the total volume of alloy extruded upon the core increases, both in direct proportion to the motion of the cylinder. The thickness of the alloy sheath on the core is evidently inversely proportional to the length of core enclosed in a given weight of sheath. Hence the thickness of the sheath depends ultimately upon the relation between the motions and/or speeds of the cylinder and of the cable issuing from the extruding head. So long as the ratio of these two speeds remains constant the thickness is invariant regardless, within limits, of the absolute speeds themselves. It is only when the speeds change relatively to each other that a variation in the alloy extruded per unit length, i. e. of the thickness of the sheath, can occur.

The various speed changes in the several gear chains described above are so predetermined that, for the particular thickness of sheath under consideration, the shaft 53 upon which the pointer is mounted is held stationary and the pointer stands at zero on the dial. If now, for instance, a part of the core appears in the extruding head which is over large, there will be insufficient room between it and the extruding die for the desired thickness of alloy and the speed of the cylinder remaining the same and therefore the volume of sheath extruded per minute remaining the same, the speed of the extruded cable will increase relatively to the speed of the cylinder throwing the velocities of the gears acting on the pointer out of balance and the pointer will swing to show "thin". If the core becomes too small the pointer will show "thick" by swinging in the opposite direction.

In practise the several gear drives and also the drive wheel 40 may be made with interchangeable parts to allow the apparatus to be set for any desired combination of core diameter and sheath thickness.

It will be noted that it is changes in the ratio of one speed to the other which are indicated by the pointer, so that the pointer moves only when the ratio of the speeds changes and not when the motions or their speeds change together.

Figure 7:
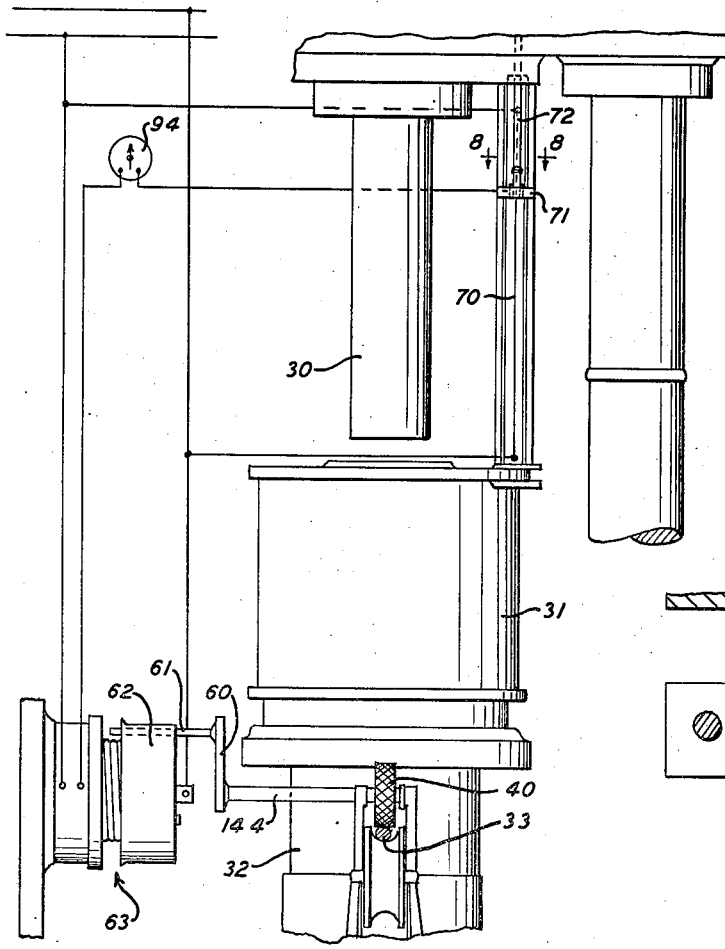
Fig. 7 is a view similar to Fig. 1 of a modified form of the embodiment.
Figure 8:
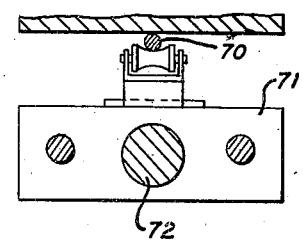
Fig. 8 is an enlarged view on the line 8—8 of Fig. 7.
Figure 9:
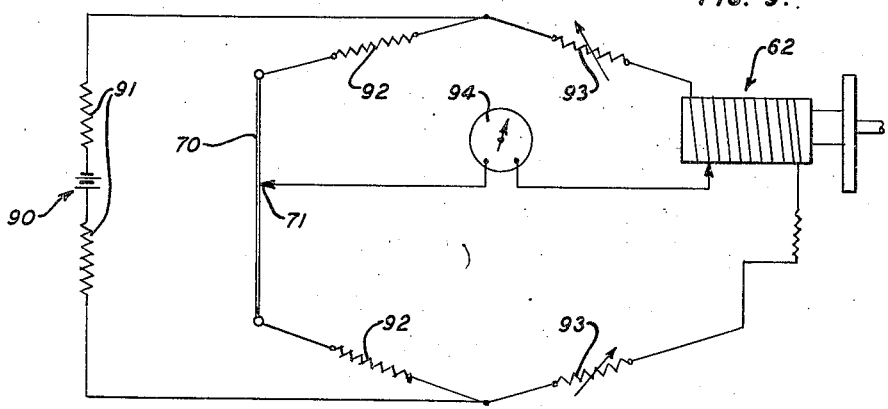
Fig. 9 is a wiring diagram of the device of Fig. 7.

In the embodiment disclosed in Figs. 7, 8 and 9, an extrusion press includes, as before, a cylinder 31 and coacting ram 30 with an extrusion head 32 carried on the cylinder from which the extrudedly sheathed cable 33 emerges. The friction wheel 40 rides on the extruded cable driving a rigid shaft 144 having a crank 60 thereon. A driving pin 61 rigidly mounted on the crank fits slidably into a corresponding aperture in the rotatable head 62 of a rotary or so-called Kohlrausch slide wire resistance 63 and thus alters the electrical resistance between the terminals of the rotary slide wire in direct proportion to the length of cable extruded.

A straight slide wire resistance 70 is rigidly mounted on the cylinder 31 and has its slide 71 secured to an operating rod 72 rigidly secured to a stationary member of the press.

The two slide wire resistances are connected in a bridge network, as shown in Fig. 9, with a source 90 of electric current or potential. Auxiliary resistances 91, 91 and 92, 92 and also variable auxiliary resistances 93, 93 are included, as shown to compensate for various constants of the network and also to provide means for adjusting the constants of the network to the speeds, volumes and weights pertaining to the extrusion of a given size of core and thickness of sheath thereon. An electrical indicating instrument 94 is connected in the bridge circuit. This may conveniently be a galvanometer.

In operation the relative displacement of the cylinder and ram is converted into directly proportional variation of the value of the slide wire resistance 70 through the corresponding relative motion of the wire 70 and slide 71, while the longitudinal advance of the cable is converted into directly proportional variation of the value of the rotary slide wire resistance 63 by the rotation of the head 62 by the wheel 40. These two constantly varying resistances are electrically balanced against each other in the network and normally vary together in a constant ratio, so that the bridge, having been initially adjusted to be in balance, remains so during the operation, unless a change occurs in the ratio of the two resistances because of a change in the relative values of the motions of the cable and of the cylinder relative to the ram, when the bridge becomes unbalanced and the instrument 94 will indicate, the direction of its motion indicating whether the sheath is too thick or too thin.

The embodiments of the invention herein disclosed are illustrative merely and may be widely modified and departed from without departing from the scope and spirit of the invention as pointed out in and limited solely by the appended claims.

What is claimed is:

1. In an extrusion apparatus having moving extruding means and constructed to produce an elongated longitudinally extruded product, means to detect variations in a relation between the motion of the extruding means and the motion of the product comprising means to convert the motion of the extruding means into a measurable and correspondingly varying quantity, means to convert the motion of the product into another measurable and correspondingly varying quantity of the same kind, means to balance the two quantities against each other, and means responsive to variations of the two quantities relative to each other.

2. In an extrusion apparatus having moving extruding means and constructed to produce an elongated longitudinally extruded product, means to detect variations in a relation between the motion of the extruding means and the motion of the product comprising means to convert the motion of the extruding means into a measurable and correspondingly varying quantity, means to convert the motion of the product into another measurable and correspondingly varying quantity of the same kind, means to magnify one quantity to equal the other, means to balance the magnified quantity against the other, and means responsive to variations of the two quantities relative to each other.

3. In an extrusion apparatus having moving extruding means and constructed to produce an elongated longitudinally extruded product, means to detect variations in a relation between the motion of the extruding means and the motion of the product comprising means to convert the motion of the extruding means into a measurable and correspondingly varying motion of another kind, means to convert the motion of the product into another measurable and correspondingly varying motion of the same kind, means to balance the two resulting motions against each other, and means to indicate variations thereof relative to each other.

4. In an extrusion apparatus having moving extruding means and constructed to produce an elongated longitudinally extruded product, means to detect variations in a relation between the motion of the extruding means and the motion of the product comprising means to convert the motion of the extruding means into a measurable and correspondingly varying motion of another kind, means to convert the motion of the product into another measurable and correspondingly varying motion of the same kind, means to magnify one of the resulting motions to equal the other, means to balance the two resulting motions against each other, and means to indicate variations thereof relative to each other.

5. In an extrusion apparatus having moving extruding means and constructed to produce an elongated longitudinally extruded product, means to detect variations in a relation between the motion of the extruding means and the motion of the product comprising means to convert the motion of the extruding means into a measurable and correspondingly varying rotary motion, means to convert the motion of the product into another measurable and correspondingly varying rotary motion, means to balance the two rotary motions against each other, and means to indicate variations thereof relative to each other.

6. In an extrusion apparatus having moving extruding means and constructed to produce an elongated longitudinally extruded product, means to detect variations in a relation between the motion of the extruding means and the motion of the product comprising means to convert the motion of the extruding means into a measurable and correspondingly varying rotary motion, means to convert the motion of the product into another measurable and correspondingly varying rotary motion, means to magnify one rotary motion to equal the other, means to balance the two rotary motions against each other, and means to indicate variations thereof relative to each other.

7. In an extrusion apparatus having moving extruding means and constructed to produce an elongated longitudinally extruded product, means to detect variations in a relation between the motion of the extruding means and the motion of the product comprising means to convert the motion of the extruding means into a measurable and correspondingly varying electrical quantity, means to convert the motion of the product into another measurable and correspondingly varying electrical quantity of the same kind, means to balance the two electrical quantities against each other, and means to indicate variations of the two electrical quantities relative to each other.

8. In an extrusion apparatus having moving extruding means and constructed to produce an elongated longitudinally extruded product, means to detect variations in a relation between the motion of the extruding means and the motion of the product comprising means to convert the quantity of displacement of the extruding means into a measurable and correspondingly varying quantity of electrical resistance, means to convert the quantity of displacement of the product into another measurable and correspondingly varying quantity of electrical resistance, means to balance the two quantities of resistance against each other, and means to indicate variations of the two quantities of resistances relative to each other.

9. In an extrusion apparatus having moving extruding means and constructed to produce an elongated longitudinally extruded product, means to detect variations in a relation between the motion of the extruding means and the motion of the product comprising a toothed member secured to the extruding means to be driven thereby, a gear driven by the member, a friction wheel driven by the moving product, a gear driven by the wheel, a third gear in a planetary gearing comprising both the precedingly named gears and proportioned to be normally stationary and to move when abnormal variation of the motion relative to each other of the two first named gears occurs, and indicating means actuated by the third gear.

10. In an extrusion apparatus having moving extruding means and constructed to produce an elongated longitudinally extruded product, means to detect variations in a relation between the motion of the extruding means and the motion of the product comprising a variable electrical resistance coupled mechanically to the extruding means to be varied thereby, a second variable electrical resistance coupled mechanically to the product to be varied thereby, an electrical network including the two resistances and a source of electrical potential to balance the two resistances against each other, and electrical indicating means connected to the nework to indicate variations of the two resistances relative to each other.

JOHN W. ANDREWS.
CECIL A. HALLAM.